Jan. 30, 1962  E. B. FERNBERG  3,019,040
FASTENER
Filed Dec. 11, 1957  2 Sheets-Sheet 2
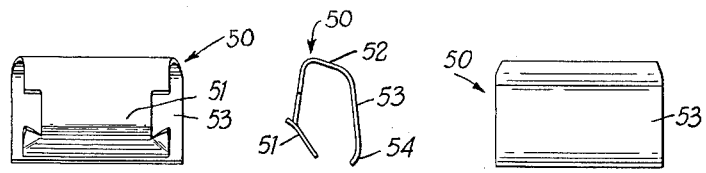
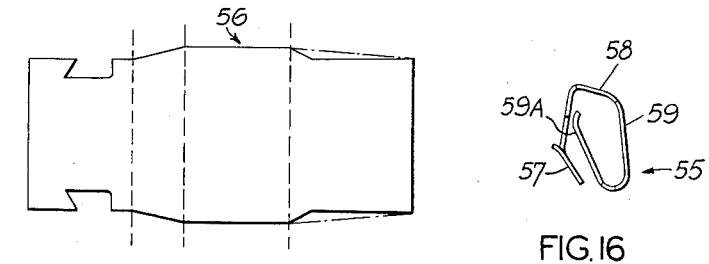
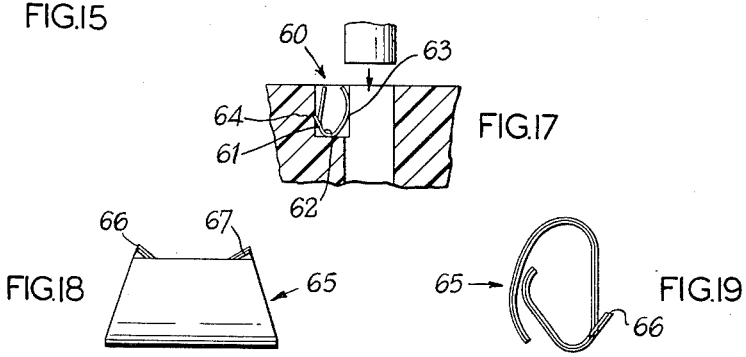
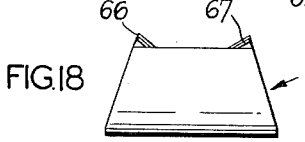
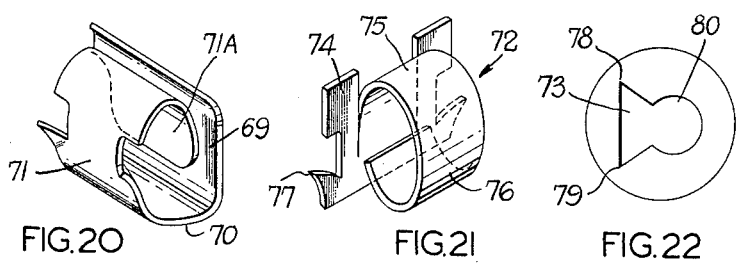
Inventor
Eric Birger Fernberg
by Malcolm W. Fraser
attorney

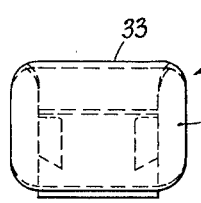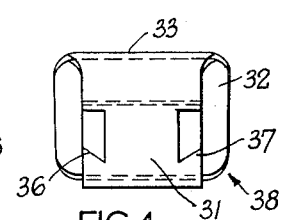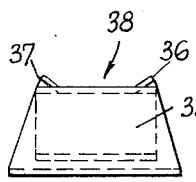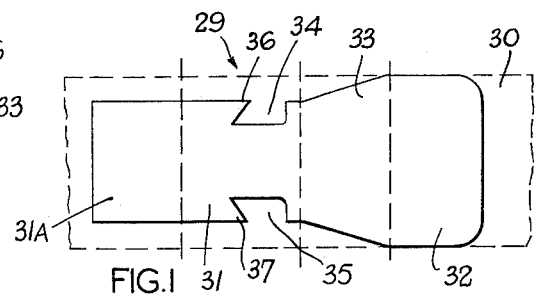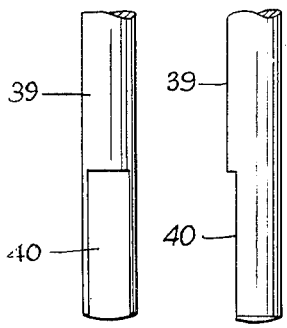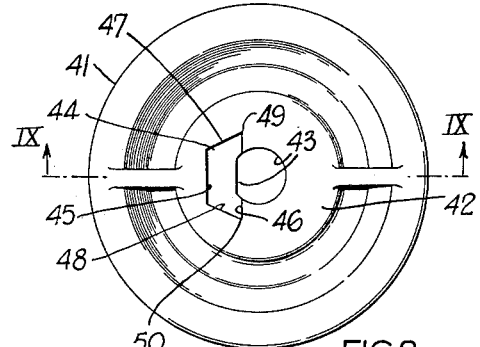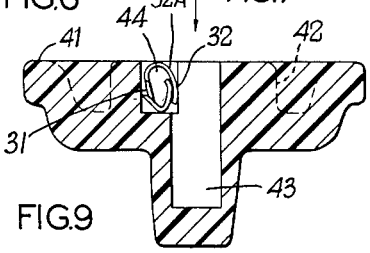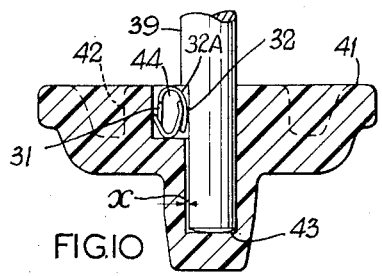

[Patent No.] 3,019,040
[Patented] Jan. 30, 1962

3,019,040
FASTENER

Eric Birger Fernberg, Northwood, England, assignor to F. T. Products Limited, London, England, a British company
Filed Dec. 11, 1957, Ser. No. 702,053
Claims priority, application Great Britain Dec. 12, 1956
6 Claims. (Cl. 287—53)

The present invention relates to an improved fastener for releasably securing together male and female members, such as a shaft with a flat on it to a knob formed with a stopped bore for reception of the shaft.

The invention also comprises within its scope the assembled male and female parts together with the fastener.

According to the invention there is provided a fastener in the form of a single strip of material, the major portion of which, or the whole of which, is of horseshoe shape and consists of a web and two limbs, the limbs first diverging outwardly from the web up to a position of maximum spread between each other and then converging toward each other to provide guiding faces in the web and in the limbs, and a pointed prong formed in one of the limbs with its point located adjacent the position of maximum spread between the limbs and with its point directed outwardly of the horseshoe and obliquely with respect to the major axis of the fastener.

According to a further feature of the invention, there is provided an assembly of a male member secured in a female member with the aid of a resilient fastener of the kind as described above, the male member being uncircular, the female member being formed with a bore of non-circular section to provide a close fit with the male member and drive the latter, said female member being further formed with a cavity having opposed walls and in one of the opposed walls an opening into the said bore, the fastener being lodged in the cavity, with the limbs pressed between said opposed walls to hold the fastener in the female member, the distance between the opposed walls of the cavity being less than the distance at the position of maximum spread between the limbs, the male member protruding through the bore and through the opening into the cavity so that the fastener is resiliently pinched between the male member and the other of the opposed cavity walls to hold the male member in the female member.

Preferred forms of the invention will now be described with reference to the accompanying diagrammatic drawings, in which:

FIGURE 1 is a plan of a blank from which a fastener may be made,

FIGURES 2, 3, 4 and 5 are respectively a plan, front, rear and side elevation of the fastener made from the blank of FIGURE 1, FIGURES 6 and 7 are respectively a front and side elevation of a portion of a shaft, FIGURE 8 is a plan of a knob to be secured to the shaft, FIGURE 9 is a section on the line IX—IX of FIGURE 8, and also showing a fastener, FIGURE 10 is a view similar to FIGURE 9, but showing the shaft as assembled in the knob with the aid of the fastener, FIGURES 11, 12, 13 and 14 are respectively a plan, front, rear and side elevation of another fastener which may be used similarly to the fastener of FIGURES 2 to 5, FIGURE 15 is a plan of a blank for another fastener, FIGURE 16 is a side elevation of the fastener formed from the blank of FIGURE 15, FIGURE 17 is a fragmentary view showing how yet another fastener is assembled in a knob, FIGURES 18 and 19 are respectively a front and side elevation of yet another fastener, FIGURES 20 and 21 are perspective views of two more fasteners, and FIGURE 22 is a plan of the hole and recess into which the fastener of FIGURE 21 fits.

At 29 in FIGURE 1 is indicated generally a blank from which a fastener is made. The blank is sheared or punched out of a parallel-sided strip of spring steel 30 shown in broken lines. One end 31, 31A of the strip is narrower than the other end 32, whilst the two ends are joined by a web portion 33 having sloping sides. Cutaway areas 34 and 35 are removed from the strip to leave a pair of symmetrically disposed prongs 36 and 37.

After being blanked to the shape shown the prongs are bent out of the plane of the strip in the same direction and the strip is bent about parallel axes (shown in broken lines) so that the major portion of the fastener 38 is of horseshoe shape shown in FIGURES 2, 3, 4 and 5, after which the fastener is, if necessary, rendered resilient and rustproof.

It will be seen that the limbs 31, 32 and the web 33 of the blank have been bent so that they first diverge outwardly from the web up to a position of maximum spread between each other and then converge toward each other to provide guiding faces in the web and in the limb, whilst the remainder 31A of the fastener is bent up to lie adjacent the inside of the limb 32. The limb 32 is outwardly convex and the end 31A, which is in effect an extension of the limb 31, may just touch, or be just clear of, the inside of the limb 32. The sense of the bending is such that the pointed prongs 36 and 37 are directed outwardly.

The fastener described is used to attach the shaft shown in FIGURES 6 and 7 to the knob shown in FIGURES 8 and 9, the complete assembly being illustrated in FIGURE 10.

The shaft 39 shown in FIGURES 6 and 7 is of commonly used kind and is cylindrical with a flat 40 formed at one end.

In FIGURES 8, 9 and 10 is shown a knob 41 which is to be removably attached to the shaft 39.

For this purpose the knob 41 is formed with a central boss 42 in which is a bore 43 of major segmental section formed on a radius a little larger than that of the shaft but with the chord of the major segment displaced from its centre further than is the chord forming the flat on the shaft. The result is that when the shaft 39 is inserted in the bore 43, as shown in FIGURE 10, it is a loose sliding fit, but has a small clearance $x$ between the shaft flat and the flat in the bore. The knob may therefore be turned a little, around the shaft, until the clearance $x$ is taken up, after which the knob can be used to turn the shaft with a positive drive.

Opening out of the "flat" side of the bore 43 in the knob is a recess 44 having a flat floor, and vertical sides and an opening of reduced size in communication with the bore 43. In plan view the recess is slightly wedge-shaped so as to have parallel sides 45 and 46 and symmetrical sides 47 and 48 which intersect on a line drawn perpendicularly through the flat in the bore and passing through the centre of the bore. The recess has vertical corners at 49 and 50.

In order to use the fastener 38 to secure the knob 41 on the end of the shaft 39, the fastener is first located in the recess 44 by pushing it into the recess with the wider limb 32 adjacent the bore 43 and then the shaft 39 is pushed into the bore 43 past the guiding face 32a in limb 32 against the spring pressure of the fastener.

Before the shaft is pushed in, and as the fastener is put into the recess, the edges and guiding face 32a of the wider limb 32 of the fastener move down the corners 49 and 50

(FIGURE 8) of the knob, whilst the prongs 36 and 37 on the narrower limb 31 of the fastener ride down the outer side 45 of the recess. During this operation the limbs 31 and 32 of the fastener are very slightly compressed together so that the end 31A bears resiliently against the inside of the limb 32.

Once the fastener has been inserted in the recess 44 in this way, there is no danger of it falling out of the knob inadvertently, since its limbs are lightly compressed and the prongs bite into the wall of the recess.

As can be seen in FIGURE 9, the limb 32 overhangs the bore 43 to an extent such that when the shaft 39 is pushed into the knob past the guiding face 32a, as shown in FIGURE 10, the limb 32 is compressed against the flat on the shaft so as to provide a strong friction grip on the shaft.

The overhang of the limb 32 into the bore 43 is such that the fastener can accommodate therein all shafts within the range of the expected tolerance.

By suitable choice of the strength of the fastener, the pull required to remove the knob may be given any desired value. When the knob is pulled off the shaft the fastener is retained in the recess in the knob in its operative position by the action of the prongs and because the limbs are compressed.

The fastener 50 illustrated in FIGURES 11 to 14 is similar to that of FIGURES 2 to 5 in that it is formed with a pronged limb 51, a web 52 and an outwardly convex limb 53, with the free end of the limb 53 stopped short at a guiding face 54. The fastener as a whole is thus of horseshoe shape and functions in a manner similar to the fastener 38 but if of the same gauge and size metal, is a little weaker and less resilient.

The fastener 55 shown in FIGURE 16 is formed from the blank 56 of FIGURE 15. This fastener has a pronged limb 57, a web 58 and an outwardly convex limb 59 the end of which is extended as at 59A and brought to lie adjacent the inside of the limb 57. In this way the strength of the fastener, i.e. its resistance to compression, and its resilience, is increased as compared with the fastener 50 of FIGURES 12 to 14.

The fastener 60 shown in FIGURE 17 is of horseshoe shape with a pronged limb 61, web 62 and outwardly convex limb 63. The prongs, such as 64, are each directed outwardly with respect to the horseshoe and towards the exterior of a face across the open mouth thereof. As shown the fastener is inserted in its recess upside-down as compared with the previously described fasteners so that the prongs 64 may hold the fastener in the recess.

The fastener 65 illustrated in FIGURES 18 and 19 is similar in all respects to that of FIGURES 2 to 5 except that it is two-ply. Two sheets of metal are blanked out identically to that of FIGURE 1, the two sheets are placed together congruently and are then bent to the shape of FIGURES 18 and 19. It is to be noted that, because the prongs 66 and 67 are bent out of the general plane of the material and on the same side of that plane, the two plies cannot come apart. Such a fastener is stronger in operation than those previously described.

As an alternative, increased strength may be given to the fastener of FIGURE 14 or 17 by placing inside it a U-shaped reinforcing spring.

In FIGURE 20 is shown another fastener 68 having a flat limb 69, a web 70 and an outwardly convex limb 71 which may if desired be extended as at 71A so that its extreme end lies against or adjacent the inner face of limb 69. In this embodiment the prongs are formed in the curved limb 71 and the flat limb 69 bears against the flat of the shaft.

The fastener 72 shown in FIGURE 21 is designed to engage in a recess having the dovetail cross-section shown at 73 in FIGURE 22. The fastener has a flat limb 74, a web 75 and an outwardly convex limb 76. The two prongs, such as that shown at 77, lie in the plane of the fastener but are nevertheless directed outwardly with respect to the horseshoe portion of the fastener.

The shape and size of the fastener and recess are such that when the fastener is pushed, web last, into the recess, the prongs ride down the corners 78 and 79 of the recess and when the fastener is seated on the floor of the recess bite into the side walls to prevent the fastener from coming out of the recess. The width of the limb 76 is a little less than the width of the opening between the recess 73 and the shaft hole 80.

It will be appreciated that any of the fasteners described herein may be turned fully upside down through 180°, or partly through 90°, provided the direction of the prongs is similarly changed. In other words, the points of the prongs must always be such as to hold the fastener in its recess.

What I claim is:

1. A fastener comprising a flat strip of spring material bent so as to have at least a portion of its length in horseshoe shape with a web and two limbs, there being formed in one limb at least one sharply pointed prong having its point bent out of the general plane of the material surrounding the prong so as to be directed outwardly with respect to the horseshoe shaped fastener, the maximum width of the pronged limb being less than the maximum width of the other limb.

2. A fastener as claimed in claim 1, comprising two strips of material formed to substantially identical blanks and bent together and similarly so as to lie one within the other in the form of a two-ply fastener.

3. An assembly of a male and a female member secured together with the aid of a fastener as claimed in claim 1, wherein the male member is in the form of a shaft with a flat at one end thereof, the female member is formed with a longitudinally extending bore provided with a flat cooperating with the flat on the shaft to prevent movement of the shaft transverse to its axis, and with a recess which communicates into the bore through an opening and which has two facing walls, the width of one of said walls being less than the width of the other wall, said other wall being disposed closer to the axis of the shaft than the flat and serving to reduce the size of said opening between the bore and recess, the fastener being located in the recess with its pronged limb engaging said one wall thereof to prevent the fastener coming out of the recess and with its other limb extending through said opening and bearing resiliently against the flat on the shaft.

4. An assembly of male and female members secured together with the aid of a fastener as claimed in claim 1, wherein the male member is in the form of a shaft with a flat on it, the female member is formed with a longitudinally extending bore with a flat on it receiving the shaft and with a recess to receive the fastener, the recess has opposed walls and is formed in one of said opposed walls with a restricted opening in communication with the bore, the fastener is lodged in the recess with its pronged limb in engagement with the other of said opposed walls, said one opposed wall being disposed between the center of said bore and said flat of said bore whereby before the shaft is inserted in the bore fastener is in compression between the opposed walls, and after the shaft is inserted in the bore the fastener is in tighter compression between the other of said opposed walls and the flat on the shaft.

5. A fastener comprising a flat strip of spring material bent so as to have at least a portion of its length in horseshoe shape with a web and two limbs, there being formed in one limb at least one sharply pointed prong having its point bent out of the general plane of the material surrounding the prong so as to be directed outwardly with respect to the horseshoe shaped fastener, the free end of the pronged limb being bent and extended along the inside of the other limb.

6. A fastener in the form of a coiled spring of between one and two coils one within the other, and having in its outer coil at least one sharply pointed prong, the point of which is bent out of the general plane of the material surrounding the prong so as to be directed outwardly of the spring.

References Cited in the file of this patent

UNITED STATES PATENTS

| | | |
|---|---|---|
| 1,085,543 | Collins | Jan. 27, 1914 |
| 1,800,055 | De Tar | May 15, 1943 |
| 2,801,118 | Amesbury | July 30, 1957 |
| 2,815,230 | Howie | Dec. 3, 1957 |

FOREIGN PATENTS

| | | |
|---|---|---|
| 735,482 | Germany | May 15, 1943 |
| 23,668 | France | July 26, 1921 |